(12) United States Patent
Matama

(10) Patent No.: US 7,042,501 B1
(45) Date of Patent: May 9, 2006

(54) IMAGE PROCESSING APPARATUS

(75) Inventor: Toru Matama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/209,751

(22) Filed: Dec. 11, 1998

(30) Foreign Application Priority Data

Dec. 12, 1997 (JP) .................... 9-342666

(51) Int. Cl.
H04N 5/228 (2006.01)

(52) U.S. Cl. .................. 348/222.1; 348/231.6

(58) Field of Classification Search ............ 348/224.1, 348/231.6, 222.1, 266, 576
See application file for complete search history.

(56) References Cited

U.S. PATENT DOCUMENTS

| 4,656,524 A | * | 4/1987 | Norris et al. ................ 358/401 |
| 4,825,296 A | * | 4/1989 | Wagensonner et al. ...... 358/443 |
| 4,837,635 A | * | 6/1989 | Santos ......................... 358/401 |
| 5,185,662 A | * | 2/1993 | Liston ......................... 358/524 |
| 5,208,903 A | * | 5/1993 | Curry .......................... 345/594 |
| 5,420,699 A | * | 5/1995 | Yamanouchi et al. ......... 355/28 |
| 5,574,533 A | * | 11/1996 | Itoh ............................ 396/429 |
| 5,596,346 A | * | 1/1997 | Leone et al. ................ 345/173 |
| 5,844,226 A |   | 12/1998 | Suzuki |
| 5,990,973 A | * | 11/1999 | Sakamoto .................... 348/246 |
| 6,016,354 A | * | 1/2000 | Lin et al. .................... 358/518 |
| 6,151,403 A | * | 11/2000 | Luo ............................ 382/117 |
| 6,292,574 B1 | * | 9/2001 | Schildkraut et al. ........ 382/103 |
| 6,295,388 B1 | * | 9/2001 | Stokes et al. ................ 382/312 |
| 6,407,777 B1 | * | 6/2002 | DeLuca .................... 348/222.1 |
| 6,480,619 B1 |   | 11/2002 | Vuylsteke et al. |

FOREIGN PATENT DOCUMENTS

| EP | 0 693 852 A2 | 1/1996 |
| JP | 03-250216 A | 11/1991 |
| JP | 05-224271 A | 9/1993 |
| JP | 06-325165 A | 11/1994 |
| JP | 08-055232 A | 2/1996 |
| JP | 09-247314 A | 9/1997 |
| JP | 09-261580 A | 10/1997 |

* cited by examiner

Primary Examiner—David Ometz
Assistant Examiner—Yogesh Aggarwal
(74) Attorney, Agent, or Firm—Birch, Stewart, Kolasch & Birch, LLP

(57) ABSTRACT

There is provided an image processing apparatus comprising a display, a display switching section, a designation section and a red eye correction section, wherein the display switching section switches in such a way that at least a region designated by the designation section in an image is displayed on the display at high resolution before or after, or both before and after the region is processed by the red eye correction section. The image processing apparatus is capable of effectively performing the red eye correction processing by simple manipulation and outputting an image of high quality without a red eye effect in high productivity.

15 Claims, 3 Drawing Sheets

IMAGE PROCESSING APPARATUS

BACKGROUND OF THE INVENTION

The present invention relates to the technical field of a digital image processing apparatus for use with digital photoprinters and like machines that read the image on a film photoelectrically and output a print (photograph) having the image reproduced thereon, and more specifically, to an image processing apparatus capable of correcting the red-eye effect of a person and an animal photographed using an electronic flash while securing good productivity.

Most of the images recorded on photographic films such as negatives and reversals (which are hereinafter referred to as "films") are conventionally printed onto light-sensitive materials (photographic papers) by a technique generally called "direct exposure" (analog exposure) in which the image on a film is projected onto the light-sensitive material for areal exposure.

A printer that adopts digital exposure has recently been commercialized. In this "digital photoprinter", the image recorded on a film is read photoelectrically and converted into digital signals, which are subjected to various kinds of image processing to produce recording image data; a light-sensitive material is exposed by scanning with recording light modulated in accordance with the according image data, thereby recording a (latent) image which is then processed photoelectrically to produce a (finished) print.

In digital photoprinters, the image is converted to digital image data and exposing conditions can be determined by processing that image data. Hence, by using such digital photoprinters, the correction of washed-out highlights or dull shadows of the due to photography with a back light or an electronic flash, sharpening (sharpness processing), the correction of color or density failures, the correction of under- or over-exposure, the correction of the insufficiency of marginal lumination and various other kinds of image processing can be performed effectively enough to produce prints of high quality that have heretofore been impossible to obtain by the direct exposure technique. In addition, a plurality of images can be composited into a single image or one image can be split into segments or even characters can be composited by the processing of image data. If desired, prints can be outputted after desired editing/processing in accordance with a specific application.

The capability of digital photoprinters is by no means limited to outputting the image as a print (photograph) and they enable the image data to be supplied to computers or stored in recording media such as floppy disks; thus, with digital photoprinters, the image data can be used in various applications other than photography.

Having these features, the digital photoprinter is composed of the following three basic parts; a scanner (image reading apparatus) that reads the image on a film photoelectrically; an image processing apparatus that performs image processing of the read image to determine the exposing conditions for image recording; and a printer (image recording apparatus) that scan exposes a light-sensitive material in accordance with the determined exposing conditions and performs development and other necessary processes to produce a print.

In the scanner, the reading light issuing from an illuminant is allowed to be incident on the film, thereby producing projected light that carries the image recorded on the film; the projected light is then passed through an imaging lens to be focused on an image sensor such as a CCD sensor which performs photoelectric conversion to read the image, which is optionally subjected to various kinds of image processing before it is sent to the image processing apparatus as the image data (image data signals) from the film.

In the image processing apparatus, the image processing conditions are set on the basis of the image data that has been read with the scanner and image processing is applied to the image data in accordance with the thus set conditions, thereby producing output image data for image recording (i.e., exposing conditions) that are subsequently sent to the printer.

In the printer, if it is an apparatus that adopts exposure by scanning with optical beams, the beams are modulated in accordance with the image data supplied from the image processing apparatus and as said optical beams are deflected in a main scanning direction, the light-sensitive material is transported in an auxiliary scanning direction perpendicular to the main scanning direction, whereby the light-sensitive material is exposed to the image-carrying optical beams to form a latent image; the exposed light-sensitive material is then developed and otherwise processed in accordance with its type so as to produce a finished print (photograph) reproducing the image that has been recorded on the film.

Incidentally, the most important factor which affects the image quality of a print such as a portrait containing a person in an image is how the person is finished, and, in particular, a red-eye effect by which the eyes of the person is made red by the effect of the light emitted from an electronic flash in photographing is a serious problem.

As mentioned above, the image processing apparatus in the digital photoprinter obtains output image data by subjecting image data read by a scanner to image processing.

Therefore, it is possible to output an appropriate image by correcting red eyes by image data processing. There has been known a method of correcting red eyes by extracting the image data of an eye region from an image using a commercially available image processing tool such as Photo Retouch Software or the like and subjecting the eye (image data of the eye) to color transformation.

However, when the red eye correction processing performed by the conventional method is applied to an apparatus such as the digital photoprinter and the like to which high productivity is required, there is a problem that a certain degree of technology is required to the operator, processing takes a long time and productivity is lowered although an image of high quality can be obtained by correcting red eyes.

SUMMARY OF THE INVENTION

An object of the present invention for solving the problem of prior art is to provide a digital image processing apparatus for subjecting the image data outputted from a film scanner which photoelectrically reads an image recorded on a photographic film and the image data of an image photographed by a digital camera to prescribed image processing to obtain output image data on a print and the like, the image processing apparatus being arranged such that it can effectively perform red eye correction processing by a simple manipulation and output a high-quality image without a red-eye effect while securing productivity.

In order to attain the above object, the present invention provides an image processing apparatus for subjecting input image data of an image obtained by optical photographing to presetted processing and making the input image data to output image data, comprising:

a display for displaying the image carried by the image data at high resolution or low resolution;

display switching means for switching at least one portion or all portions of the image displayed on said display from the low resolution to the high resolution and vice versa;

designation means for designating a region including an eye in the image of the low resolution displayed on said display by said display switching means; and red eye correction means for correcting a red eye effect by subjecting the output image data of the eye in the region designated by said designation means to eye color transformation processing, wherein said display switching means switches in such a way that at least the region designated by said designation means in the image is displayed on said display at high resolution before or after, or both before and after the region is processed by said red eye correction means.

Preferably, the image processing apparatus further comprises at least one of means for selecting either one of execution and non-execution of processing by said display switching means, said designation means and said red eye correction means as a mode, means for automatically determining said either one of the execution and the non-execution of the processing from photographing information and means for selecting and indicating said either one of the execution and the non-execution of the processing.

Preferably, the photographing information is at least one of whether photographing is performed using an electronic flash or not, a subject brightness range, a photographing distance, positions of main elements in a picture, a focal length of a lens, a type of a camera.

Preferably, the image processing apparatus further comprises means for determining the non-execution of the processing from the photographing information in the mode that the processing is performed.

Preferably, said red eye correction means comprises:

image data taking-out means for taking out the image data in said region including the eye which is designated by said designation means from said output image data;

color transforming means for subjecting the image data of said eye in the region taken out by said image data taking-out means to the eye color transformation processing; and image data replacing means for replacing said output image data in the region to be taken out by said image data taking-out means with the image data of the eye in the region which is substituted to the eye color transformation processing by said color transforming means.

Preferably, said display switching means allows the image in said region including the eye before or after the region is processed by said red eye correction means to enlarge and display on the display at the high resolution.

Preferably, said input image data of the image obtained by the optical photographing are image data which are read photoelectrically from an image on a photographic film that is photographed and then developed.

Preferably, said images which are displayed on the display at the high resolution and the low resolution are images based on the input image data which are read photoelectrically at the high resolution and the low resolution from the image carried on the photographic film.

Preferably, said input image data of the image obtained by the optical photographing are image data obtained directly by photographing a subject.

DETAILED DESCRIPTION OF THE INVENTION

The image processing apparatus of the invention will be now described in detail with reference to the preferred embodiment shown in the accompanying drawings.

Figure 1:
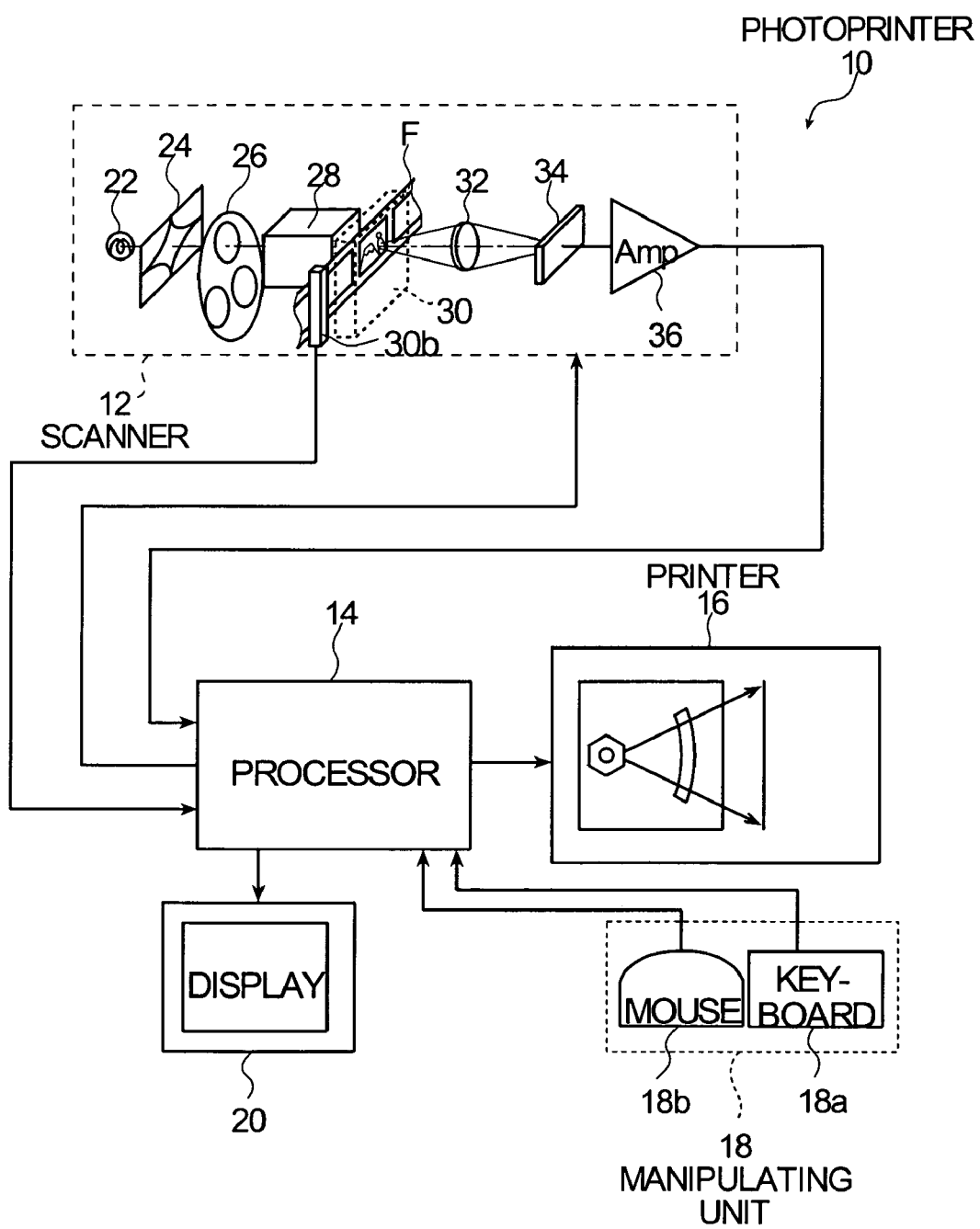
FIG. 1 is a block diagram of an embodiment of a digital photoprinter using the image processing apparatus of the invention.

FIG. 1 is a block diagram for an exemplary digital photoprinter using the image processing apparatus of the invention. The digital photoprinter generally indicated by 10 in FIG. 1 and which is hereinafter referred to simply as the "photoprinter" basically comprises: a scanner (image reading apparatus) 12 that reads the image on a film F photoelectrically; an image processing apparatus 14 that performs image processing of the thus read image data (image information), that selects, sets and changes the image processing conditions, and that allows for manipulation, control and otherwise of the photoprinter 10 in its entirety; and a printer (image recording apparatus) 16 that exposes a light-sensitive material A imagewise with optical beams modulated in accordance with the image data processed in the image processing apparatus 14, develops and otherwise processes the material A and outputs it as a (finished) print.

Connected to the image processing apparatus 14 are a manipulating unit 18 having a keyboard 18a and a mouse 18b to enter (set) various conditions, to select and issue a command for a specific processing step and to enter commands for color/density correction, as well as a display 20 that displays the image read with the scanner 12, various kinds of manipulative instructions, and screens on which various conditions are set and/or registered.

The scanner 12 is an apparatus for reading the image on the film F photoelectrically frame by frame. It comprises an illuminant 22, a variable diaphragm 24, a color filter plate 26 that has three color filters for separating the image into three primaries R (red), G (green) and B (blue) and which rotates to insert any one of the color filters into the optical path, a diffuser box 28 with which the reading light incident on the film F is made uniform on the plane of the film F, an imaging lens unit 32, a CCD sensor 34 which is an area sensor that reads the image in each frame of the film, and an amplifier 36.

The illustrated photoprinter 10 has dedicated carriers 30 available that can be selectively mounted in the housing of the scanner 12 depending upon such factors as the type and size of films such as an Advanced Photo System and negatives (or reversals) of 135 size, the physical form of the film (e.g. whether it is a strip or a slide) and the kind of treatment to be applied (e.g. trimming). By changing carriers 30, the photoprinter 10 is capable of handling various kinds of films and treatments.

An image (frame) recorded on a film and used to create a print is transported to and held at a prescribed reading position by the carrier 30.

As known well, the film of an Advanced Photo System has a magnetic recording medium formed thereon and various kinds of data are recorded to the magnetic recording medium in photographing and development. A carrier 30 for the film (cartridge) of Advanced Photo System is provided with a means 30a for reading the magnetic information. Thus, when the film is transported to a reading position, the magnetic information is read and necessary information is sent to the processor 14, the necessary information encompassing a photographing date, the type of a film developing machine, a cartridge ID, whether an electronic flash was used or not in photographing, a subject brightness range (BV value), a photographing distance, the positions of main elements in a picture, and the like.

In the scanner 12, reading light issuing from the illuminant 22 is adjusted in quantity by passage through the variable diaphragm 24, then passed through the color filter plate 26 for color adjustment, and diffused in the diffuser box 28; the thus treated reading light is incident on a frame of the film F which is held at a prescribed reading position by a carrier 30, through which it is transmitted to produce projected light that carries the image in the particular frame of the film F.

The projected light from the film F passes through the imaging lens unit 32 to be focused on the light-receiving plane of the CCD sensor 34 and read with the CCD sensor 34 photoelectrically; the resulting output signal is amplified with the amplifier 36 and thereafter sent to the image processing apparatus 14.

The CCD sensor 34 may be an area sensor having, for example, 1380×920 pixels. In the illustrated system, the CCD sensor 34 is adopted to move around two-dimensionally (both horizontally and vertically along the pixels) by an amount equivalent to half a pixel; because of this feature, the number of pixels that can be read with the CCD sensor 34 is apparently increased by a factor of up to 4.

In the scanner 12, the above-described process of image reading is performed three times by sequentially inserting the respective color filters in the color filter plate 26 into the optical path of the reading light, whereupon the image in one frame is separated into three primaries R, G and B.

Prior to fine scanning, or the image reading for outputting a print P, the photoprinter 10 performs prescanning, or reading of the image at a lower resolution, in order to determine the image processing conditions and so forth. This means the image reading is performed a total of six times for one frame.

In the illustrated photoprinter 10, the scanner 12 that reads the image on a film such as a negative or reversal photoelectrically is used as a source of supplying image data to the image processing apparatus 14. Other sources may of course be used to supply image data into the image processing apparatus 14 and are exemplified by various kinds of image reading means, imaging means and image data storage means including an image reading apparatus that reads the image on a reflection original, a digital camera, a digital video camera, communication means such as a LAN (local area network) and a computer conferencing network and various other media such as a memory card and MO (magnetooptical recording medium).

As already mentioned, the output signal (image data) from the scanner 12 is delivered to the image processing apparatus 14.

Figure 2:
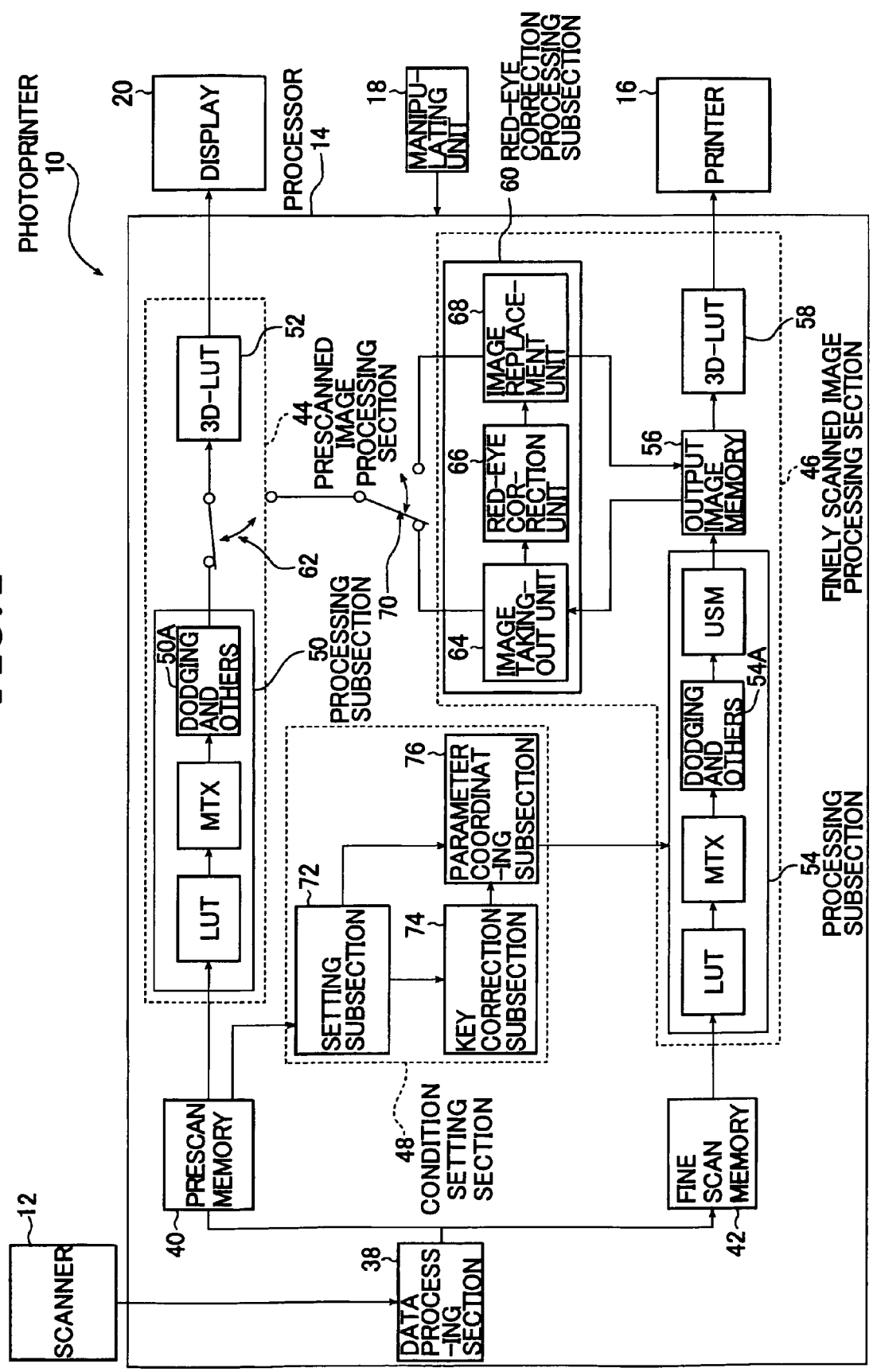
FIG. 2 is a block diagram of an embodiment of the image processing apparatus of the invention in the digital photoprinter shown in FIG. 1.

FIG. 2 is a block diagram of the image processing apparatus 14. As shown, the image processing apparatus 14 (hereinafter, referred to simply as "processor 14") comprises a data processing section 38, a prescan (frame) memory 40, a fine scan (frame) memory 42, a prescanned image processing section 44, a finely scanned image processing section 46, and a condition setting section 48.

FIG. 2 is mainly intended to show the sites that are related to image processing. In addition to the components shown in FIG. 2, the processor 14 includes a CPU that controls and manages the photoprinter 10 in its entirety including the processor 14, a memory that stores the information typically necessary for the operation of the photoprinter 10, and means for determining a specific value to which the variable diaphragm 24 should be stopped down during fine scanning and the storage time of the CCD sensor 34. The manipulating unit 18 and the display 20 are connected to the associated sites via the CPU and related parts (i.e., CPU bus).

The output signals associated with R, G and B that have been delivered from the scanner 12 are processed in the data processing section 38 where they are subjected to various processes including A/D (analog/digital) conversion, log conversion, DC offset correction, darkness correction and shading correction and the resulting digital image data is stored in the prescan memory 40 if it is prescanned (image) data and in the fine scan memory 42 if it is finely scanned (image) data.

It should be noted here that the prescanned (image) data and the finely scanned (image) data are essentially the same except for the pixel density and the signal level. In the illustrated apparatus, the signal level of the prescanned data is shifted from that of the finely scanned data because the amount by which the variable diaphragm 24 is stopped down during fine scanning is set to an optimum value on the basis of the prescanned image data.

The prescanned data stored in the prescan memory 40 is processed in the prescanned image processing section 44 and the finely scanned data stored in the fine scan memory 42 is processed in the finely scanned image processing section 46, respectively.

The prescanned image processing section 44 comprises an image processing subsection 50 and a color transform signal processing subsection 52. The finely scanned image processing section 46 comprises an image processing subsection 54, an output image memory 56, a color transform signal processing subsection 58 and a red eye correction processing subsection 60.

The image processing subsection 50 in the prescanned image processing section 44 (which is hereinafter referred to as "processing subsection 50") and the image processing subsection 54 in the finely scanned image processing section 46 (which is hereinafter referred to as "processing subsection 54") are both sites at which the image (image data) read with the scanner 12 is subjected to a specified kind of image processing in accordance with the image processing conditions set by means of the condition setting section 48 that will be described below in detail. Except for the pixel density of the image data to be processed, the two processing subsections perform essentially the same processing.

The image processing to be performed by the processing subsections 50 and 54 may be exemplified by gray balance adjustment (color balance adjustment), contrast correction (gradation conversion), brightness correction, dodging (compression/expansion of the dynamic range of densities), saturation correction, etc. The processing subsection 54 which processes the finely scanned data also performs sharpening (sharpness processing).

These corrections may be performed by any known methods by suitably combining operations for image processing, processing with LUTs (look-up tables), matrix (MTX) operations, processing with filters and the like. In the illustrated example, gray balance adjustment, brightness correction and contrast correction are performed using a correction look-up table (LUT) in an LUT block, saturation correction is performed by matrix operations in an MTX block and sharpening is performed by means of averaging using an unsharpness mask (USM) in a USM block.

Dodging and other processes are performed in a block 50A and a block 54A in response to an operator's command or in accordance with image data.

The color transform signal processing subsection 52 in the prescanned image processing section 44 is a site at which the image data processed by the processing subsection 50 is magnified or reduced by electronic scaling as necessary, transformed with 3D (three-dimensional)-LUT or the like and made to image data corresponding to the display on the display 20.

A switching means 62 is disposed upstream of the color transform signal processing subsection 52 to connect the color transform signal processing subsection 52 with the processing subsection 50 or the red eye correction processing subsection 60 in the finely scanned image processing section 46. The display 20 can display not only a prescanned image but also a finely scanned image before and after it is processed with the red eye correction processing subsection 60.

The color transform signal processing subsection 58 in the finely scanned image processing section 46 is a site at which it transforms the image data processed by the processing subsection 54 by means of the 3D-LUT and supplies it to the printer 16 as image data corresponding the image recorded by the printer 16, likewise.

In the processor 14 according to the present invention, the output image memory 56 is interposed between the processing subsection 54 of the finely scanned image processing section 46 and the color transform signal processing subsection 58 and the red eye correction processing subsection 60 is connected to the output image memory 56.

In the illustrated example, when red eye correction processing is not performed, the image data processed with the processing subsection 54 is supplied to the color transform signal processing subsection 58 passing through the output image memory 56, whereas when the red eye correction processing is performed, the image data processed with the processing subsection 54 is stored in the output image memory 56 once and then supplied to the color transform signal processing subsection 58 after it is processed by the red eye correction processing subsection 60.

The red eye correction processing subsection 60 comprises an image taking-out unit 64, a red eye correction unit 66 and an image replacement unit 68.

When the execution of the red eye correction processing is indicated, the image taking-out unit 64 takes out the region including an eye of a person or an animal in an image which is indicated by the operator from the output image memory 56 and stores it in a work memory (not shown).

The operator indicates the region including the eye by a known method using a prescanned image displayed on the display 20.

Specifically, there are exemplified a method of indicating two diagonal points in a rectangle including an eye from the prescanned image displayed on the display 20 with the mouse 18b, a method of taking out the region including an eye in a prescribed shape such as a circle, ellipse, rectangle and the like using the mouse 18b, a method of taking out the region of a prescribed size (which can be changed) whose center is located at an intermediate point or the like between both eyes, and so on. When there are a plurality of persons or animals in an image, a region is designated for each of the persons.

The red eye correction unit 66 is a site for reading the image data stored in the work memory of the image taking-out unit 64 and subjecting the image (image data) to the red eye correction processing such as an eye color transformation processing.

The method of correcting red eyes is not particularly limited and various known methods may be used. For example, there is exemplified a method of creating a brightness histogram using the above image data, extracting a low brightness region from the brightness histogram, subjecting the extracted low brightness region to contraction processing and extracting the entire region of an eye and processing the region of the eye, for example, correcting a red eye by the transformation of hue or the reduction of saturation. As the method of correcting a red eye by the transformation of hue, there is exemplified, for example, a method of preparing the data of colors of various kinds of eyes (black eye, blue eye), designating the intrinsic color of the eye of a person as a subject, and transforming the image data of the region of the eye to the color data of the eye. Further, when a person has intrinsically a black eye, a red eye can be corrected by lowering the saturation of the region of the eye and approaching it to an achromatic color.

The image data of the region including the eye corrected by the red eye correction unit 66 is sent to the image replacement unit 68.

The image replacement unit 68 stores the thus sent image data in the work memory as necessary and replaces the image data in the corresponding region of the image stored in the output image memory 56 (that is, the region including the eye indicated by the operator) with the image data sent from the red eye correction unit 66 in response to the command of the operator. The image (image data) stored in the output image memory 56 is subjected to the red eye correction processing by the above processes.

When the red eye correction is performed, image data is read from the output image memory 56 by the color transform signal processing subsection 58 on the completion of the replacement process and transformed and then supplied to the printer 16 as image data corresponding to the image recorded by the printer 16.

The image taking-out unit 64 and the image replacement unit 68 can be connected to the switching means 62 through a switching means 70, respectively and the images stored in the work memories of them can be displayed on the display 20.

That is, the image stored in the image taking-out unit 64 and having the region including the red eye indicated by the operator is displayed on the display 20 before the red eye in the region is not corrected by connecting the image taking-out unit 64 to the color transform signal processing subsection 52 through the switching means 62 and the switching means 70; and the image in the above region stored in the image replacement unit 68 is displayed on the display 20 after the red eye in the region is corrected by connecting the image replacement unit 68 to the color transform signal processing subsection 52 through the switching means 62 and the switching means 70.

In the processor 14 according to the present invention, the digital image processing apparatus capable of subjecting the image data obtained by photographing to the red eye correction processing can effectively correct a red eye while securing good productively in such a manner that the operator indicates the region including an eye, a red eye is corrected by finely scanned data using the region as well as the image before and/or after the red eye is corrected is displayed by an image of high resolution obtained from the finely scanned data.

According to the above digital image processing, a red eye can be preferably corrected as mentioned above. However, a red eye correcting method according to conventional image processing is troublesome because the operator is required to perform a job for taking out an eye. Moreover, although the confirmation of an image such as the verification thereof by the operator and the like is performed using prescan data of low resolution, it is difficult to confirm a red eye state by an image of low resolution, which makes a red eye correcting job performed by image processing more troublesome and time consuming.

Whereas, since the present invention is arranged as mentioned above, an eye can be simply indicated by the operator and the red eye state can be easily confirmed by the image of high resolution, whereby a red eye can be effectively corrected without lowering productivity.

In the present invention, the finely scanned data (image) of only the region indicated by the operator may be displayed on the display 20 by magnifying or reducing the region by electronic scaling through the color transform signal processing subsection 52; the finely scanned image may be displayed in the real size thereof; or the picture of the whole body of a person or the closed-up picture of the face of the person may be displayed in a size magnified by the operator in accordance with the size of an eye or in a real size. Note, the switching of the display size may be automatically determined by the apparatus on the basis of the ratio occupied by a skin color region and the like.

In addition, both of the prescanned image and the image of the region indicated by the operator may be displayed on the display 20.

The conditions for the various kinds of image processing to be performed by the prescanned image processing section 44 and the finely scanned image processing section 46 are set by the condition setting section 48.

The condition setting section 48 comprises an image processing condition setting subsection 72, a key correcting subsection 74 and a parameter coordinating subsection 76.

In the image processing condition setting subsection 72 (which is hereinafter referred to simply as "setting subsection 72"), a certain kind of image processing that should be applied is selected. In addition, using the prescanned image, the setting subsection 72 sets the conditions for the image processing that should be performed in the processing subsections 50 and 54 and supplies the thus set conditions to the parameter coordinating subsection 76.

Specifically, the setting subsection 72 constructs density histograms and calculates characteristic quantities of an image such as its average density, LATD (large area transmission density), highlight (minimum density) and shadow (maximum density) from the prescanned data; in addition, in response to an operator's command that is optionally entered from the manipulating unit 18, the setting subsection 72 performs various operations such as construction of gray balance adjustment, brightness correction and contract correction tables (LUTs), generation of matrix operations for saturation correction and the determination of a sharpness coefficient; the setting subsection 72 may determine any other necessary image processing conditions.

The key correcting subsection 74 is such that the amounts of adjustment of the image processing conditions are calculated in response to commands for various kinds of adjustments that are entered by typing on brightness (D) adjustment key, C (cyan), M (magenta) and Y (yellow) color adjustment keys, γ (contrast) adjustment key, sharpness adjustment key and saturation adjustment key that are set on the keyboard 18a as well as manipulating the mouse 18b; the calculated values are supplied to the parameter coordinating subsection 76.

If inputs for color adjustment, density adjustment and contrast adjustment are entered from the manipulating unit 18, the corresponding amounts of correction are calculated in the key correcting subsection 74 and, in accordance with the calculated amounts of correction, the parameter coordinating subsection 76 adjusts the shift and inclination of relational expression in the tables. If an input for sharpness adjustment is entered, the coefficient for sharpness correction is changed likewise; and if an input for saturation adjustment is entered, the matrix operation formula for saturation correction is adjusted likewise.

The parameter coordinating subsection 76 receives the image processing conditions set by the setting subsection 72, sets the supplied image processing conditions both in the processing subsection 50 of the prescanned image processing section 44 and the processing subsection 54 of the finely scanned image processing section 46, and corrects (adjusts) the thus set image processing conditions in accordance with the amounts of adjustment calculated in the key correcting subsection 74 or makes a second setting with the thus corrected image processing conditions.

The image processing apparatus of the present invention will now be described in greater detail by explaining the action of the processor 14.

When prescanned data is stored in the prescan memory 40 as mentioned above, the setting subsection 72 reads the stored data from the memory, creates density histograms and calculates the characteristic amounts of an image, creates the above various kinds of the correction tables and the matrix calculation formulas and supplies them to the parameter coordinating subsection 76.

In parallel with these steps, the reading conditions for fine scanning are set that are exemplified by the determination of the value to which the variable diaphragm 24 should be stopped down so that the scanner 12 is adjusted and the scanner 12 performs fine scanning, whereupon the finely scanned data are sequentially transferred to and stored in the fine scan memory 42.

The parameter coordinating subsection 76 sets the received image processing conditions at specified sites (hardware) in both the processing subsection 50 of the prescanned image processing section 44 and the processing subsection 54 of the finely scanned image processing section 46.

Subsequently, the prescanned data is read from the prescan memory 40, processed under the image processing conditions that have been set in the processing subsection 50 and transformed in the color transform signal processing subsection 52 to produce a prescanned image that has been given all of the specified kinds of processing, which is then presented on the display 20.

Looking at the presentation on the display 20, the operator verifies the image, or the result of the image processing, and optionally adjusts its color/density, gradation, saturation, sharpness and other characteristic features using the above-mentioned keys set on the keyboard 18a.

The inputs of these adjustments are sent to the key correcting subsection 74, which calculates the amounts of correction of the image processing conditions in accordance with the entered inputs and sends them to the parameter coordinating subsection 76. As already mentioned, in accordance with the thus sent amounts of correction, the parameter coordinating subsection 76 corrects the adjustment tables and the matrix calculations of the processing subsections 50 and 54. Therefore, in accordance with these corrections, or the operator-entered inputs of adjustments, the image presented on the display 20 also varies.

If the operator determines that an image is proper excluding a red eye when the red eye correction processing is performed, he indicates the region including the eye in the image displayed on the display 20.

When the red eye correction processing is not performed, if the operator concludes that the image displayed on the display 20 is appropriate (i.e., the result of the verification is satisfactory), he manipulates the keyboard 18a or the like to enter a command for starting the printing operation. As a result, the image processing conditions are finalized and the finely scanned data is read from the fine scan memory 42, processed in the processing subsection 54 in the finely scanned image processing section 46 under the finalized conditions, sent through the output image memory 56 to the color transform signal processing subsection 58, where it is converted to image data associated with the image recorded by the printer 16, to which it is subsequently sent.

When neither the verification nor the red eye correction processing is performed, the image processing conditions are finalized at the point of time when the parameter coordinating subsection 76 ended the setting of those conditions in the processing subsection 54 of the finely scanned image processing section 46, whereupon the finely scanned data is processed automatically and sent to the printer 16.

It is preferable that the above steps can be selected by working modes and the like.

As mentioned above, when the region including an eye is indicated by the operator, the image processing conditions of the processing subsection 54 in the finely scanned image processing section 46 are finalized, the finely scanned data is read from the fine scan memory 42 and the image data processed with the processing subsection 54 is stored in the output image memory 56.

Next, the image taking-out unit 64 takes out the region indicated by the operator from the output image memory 56 and stores the image data of the region in the work memory. In parallel with the above operation, the image taking-out unit 64 is connected to the color transform signal processing subsection 52 through the switching means 62 and the switching means 70, the image stored in the work memory, that is, the image of the region including the eye indicated by the operator is magnified as necessary and displayed on the display 20.

When the operator determines that a red eye must be corrected looking at the presentation on the display 20, he indicates to correct it.

When the operator determines that the correction of the red eye is not necessary, he indicates the start of the printing operation likewise the above case so that the image data stored in the output image memory 56 is read and processed in the color transform signal processing subsection 58 and then sent to the printer 16.

When the taken-out region is not inappropriate, the fact may be entered and the region including the eye may be indicated again.

When the indication for correcting the red eye is issued, the red eye correction unit 66 reads image data from the work memory of the image taking-out unit 64 and send the image data to the image replacement unit 68 after it is subjected to the red eye correction processing as mentioned above. The image replacement unit 68 stores the image data subjected to the red eye correction processing and sent thereto in the work memory.

In parallel with the above operation, the image replacement unit 68 is connected to the color transform signal processing subsection 52 through the switching means 62 and the switching means 70 and the image stored in the work memory of the image replacement unit 68 is magnified as necessary and displayed on the display 20.

The operator determines whether the red eye correction processing has been appropriately performed or not from the image displayed on the display 20. When the processing has been inappropriately performed, the operator indicates any one of the start of a print operation without executing the red eye correction processing; the interruption of the creation of the frame to which the red eye correction processing was not performed (or the reading of the frame again); or the execution of the red eye correction by the change of the parameters of the red eye correction processing (for example, hue, the threshold value for extracting an eye region, etc.).

When the operator determines that the red eye correction processing has been appropriately performed, he indicates to start the printing operation likewise the above case. The image data stored in the work memory of the image replacement unit 68 is replaced with the corresponding image data stored in the output image memory 56 in response to the indication. On the completion of the replacement, the image data stored in the output image memory 56 are read and sent to the printer 16 after they are processed in the color transform signal processing subsection 58.

Both the images before and after the correction of the red eye are displayed and subjected to various kinds of processing in the example mentioned above. However, the present invention is not limited thereto and only any one of the images before and after the correction of the red eye may be displayed and subjected to only processing corresponding to the image. Since the image corresponding to the corrected red eye is confirmed at high resolution in any case, the image can be confirmed effectively and correctly, whereby the drop of productivity can be minimized.

As mentioned above, according to the image processing apparatus of the invention, a red eye can be corrected more effectively and more promptly as compared with a conventional apparatus. However, when the red eye is corrected in the invention, productivity is also dropped as compared with a print created ordinarily without correcting the red eye.

To cope with this problem, it is preferable in the invention to set whether the red eye correction processing is to be performed or not (execution/non-execution) as a working mode so that the execution of it can be optionally selected. Further, the mode of the execution/non-execution of the red eye correction processing and the above mode of the execution/non-execution of the verification may be set as a combined mode (for example, a mode for executing both verification and red eye correction processing, a mode for not executing verification but executing red eye correction processing, etc). It should be noted here that the operator may confirm an image before correction and determine whether the red eye correction processing is necessary or not even in the red eye correction execution mode, as mentioned above.

It is preferable that the operator selects, determines and indicaes whether a red eye effect must be corrected or not for each frame in accordance with a prescanned image, the image recorded on a film, photographing information and the like and further in accordance with the desire of a customer to red eye correction when he requests to make development and prints simultaneously or requests to make extra prints, the information recorded on the ID card of the customer, and the like.

When photographing information can be obtained from a film and the like as in the case of an Advanced Photo System, it is also preferable to automatically determine whether the red eye correction processing must be performed or not using the photographing information.

Since a red eye is essentially a effect which occurs when light is emitted from an electronic flash in photographing, the execution of the red eye correction processing may be automatically determined only when photographing is executed using the electronic flash.

Since the occurrence of the red eye effect is also affected by a subject luminance (BV value), a photographing distance, the positions of main elements in a picture, the focal length of a lens, the type of a camera, and so on, whether a red eye must be corrected or not may be automatically determined taking the above factors into, consideration when photographing is performed using an electronic flash. Specifically, the red eye effect is liable to arise when a camera is a compact camera and, in particular, a compact camera with a zoom lens, when the luminance of a subject is 8 or less, when the focal length of a lens is 50 mm or longer and, in particular, 70 mm or longer, when a photographing length is 2 m or longer and, in particular, 3 m or longer. Therefore, the apparatus may automatically determine to perform the red eye correction processing if one or a prescribed number of the factors exist when photographing is performed using the electronic flash.

Figure 3:
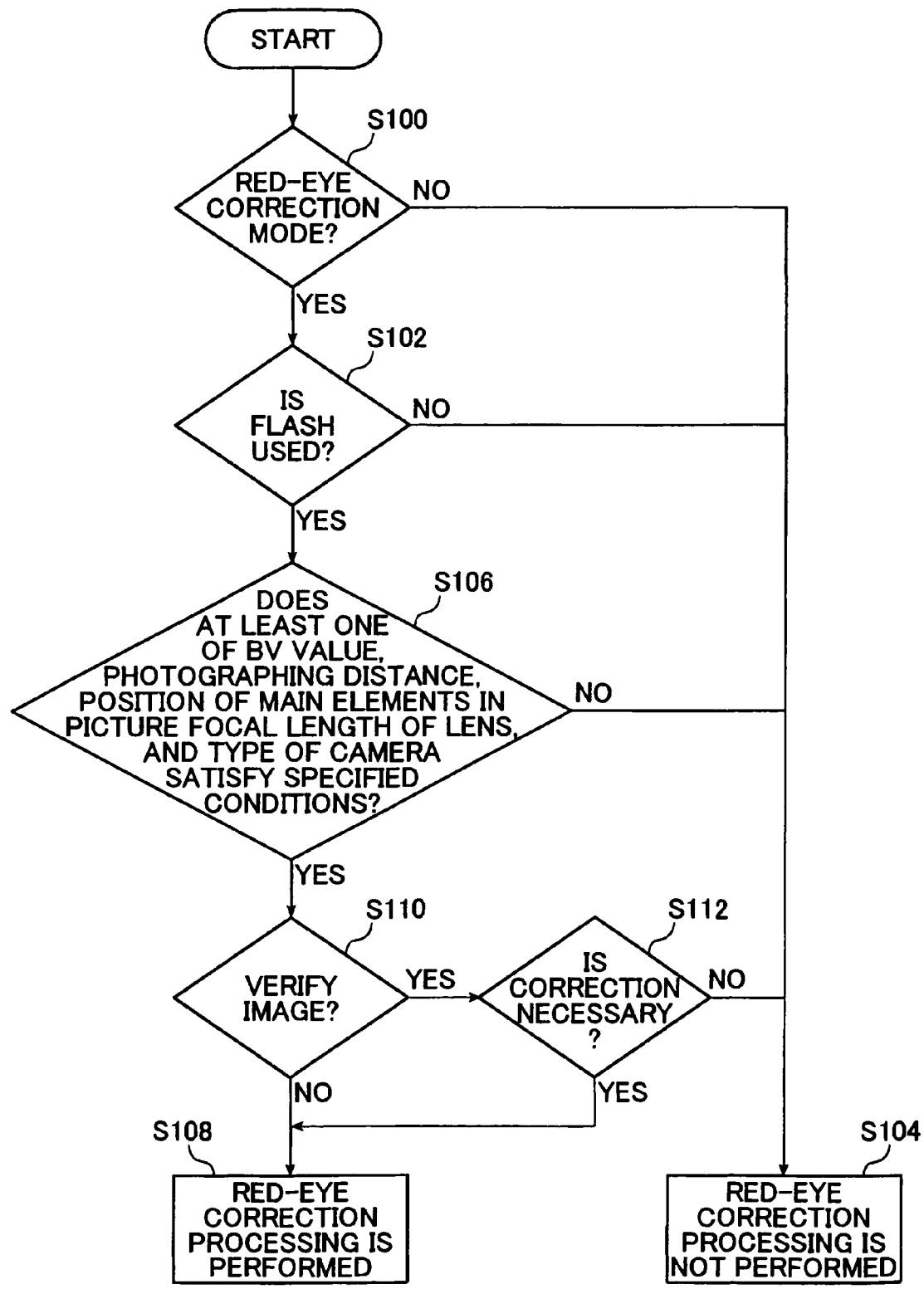
FIG. 3 is a flowchart showing an example of the flow of the process in which whether or not the red eye correction is to be performed is automatically determined in an operation setting section of the image processing apparatus shown in FIG. 2 based on photographing information.

For example, whether or not the red eye correction processing is to be performed can be automatically determined for each frame using the photographing information as in the flowchart shown in FIG. 3.

More specifically, as shown in the flowchart of FIG. 3, in Step S100 whether or not it is in the red-eye correction mode is determined. When determined as non-red eye correction mode (NO), the operation proceeds to Step S104, where it is deemed that the red eye effect is unlikely to occur and non-execution of the red eye correction processing is thus automatically determined.

On the other hand, when determined as red eve correction mode (YES) in the Step S100 the operation proceeds to Step 102, where it is determined whether or not the photographing information acquired from the scanner 12 indicates the use of electronic flash in the photography. If electronic flash is not used in the photography (NO) or if the red eye correction made is not being used, the operation proceeds to Step S1104, where it is deemed that the red eye effect is unlikely to occur and non-execution of the red eye correction processing is thus automatically determined.

On the other hand, if it is determined in Step S102 that electronic flash is used in the photography (YES), it is determined in Step S106 whether or not the photographing information is information in which at least one of the subject brightness range, photographing distance, positions of main elements in a picture, focal length of a lens, and type of a camera satisfies the specified conditions as mentioned above.

If it is determined in Step S106 that the information does not satisfy the specified conditions (NO), the operation proceeds to Step S104 where it is deemed that the red eye effect is unlikely to occur and non-execution of the red eye correction processing is thus automatically determined.

Contrarily if it is determined in Step S106 that information satisfies the specified conditions (YES), where it is deemed that the red eye effect is likely to occur so that the operation proceeds to Step S110 to determine whether or not the image is verified. When determined to be not verified (NO), the operation proceeds to Step S108, where it is deemed that the red eye effect is quite likely to occur and execution of the red eye correction processing is thus automatically determined.

On the other hand, if it is determined to be verified (YES) in the Step S110, then the displayed image is verified in the Step 112 to determine whether or not the red eye correction processing is needed. When determined that the red eye correction is not needed (NO) in the Step S112, the operation proceeds to Step S104, where it is deemed that the red eye effect is unlikely to occur and non-execution of the red eye correction processing is thus automatically determined. When determined that the red eye correction processing is needed (YES) in the Step S112, the operation proceeds to Step S108 to automatically determine execution of the red eye correction processing.

The above automatic determination may be performed in combination with the red eye correction execution mode mentioned above.

For example, even if the red eye correction execution mode is set to the apparatus and red eye correction is essentially performed to all the frames, image data may be outputted without executing the red eye correction processing when photographing information that no light was emitted from an electronic flash is obtained.

Further, when a customer database is prepared, a film ID, a cartridge ID and the frame numbers of the frames to which the red eye correction processing was performed are recorded to the database and when extra prints are requested, the execution of the red eye correction processing may be automatically determined in accordance with the information recorded to the customer database.

The image processing apparatus of the present invention may be provided with only one of the means for selecting whether the red eye correction processing is performed or not as the mode, the means for automatically determining the execution of it from photographing information and the means for permitting the operator to select and indicate the execution of the processing or may be provided with a plurality of them.

As mentioned above, the image data processed by the processor 14 is sent to the printer 16.

The printer 16 exposes a light-sensitive material (photographic paper) in accordance with image data, records a latent image on the light-sensitive material, subjects the latent image to development processing in accordance with the light-sensitive material and outputs it as a (finished) print. For example, after the light-sensitive material is cut to a prescribed length in accordance with a print, a back print is recorded on the thus cut light-sensitive materials; three kinds of light beams for red (R) exposure, green (G) exposure and blue (B) exposure which correspond to the spectral sensitivity characteristics of the light-sensitive material (photographic paper) are modulated in accordance with image data (image to be recorded) as well as deflected in a main scanning direction and the light-sensitive material is transported in an auxiliary scanning direction which is perpendicular to the main scanning direction so that the latent image is recorded; the light-sensitive materials on which the latent image is recorded are subjected to prescribed wet type development processing such as color formation/development, bleaching/fixing, washing and the like and dried; and the light-sensitive materials are sorted and accumulated after they are made to prints.

While the image processing apparatus of the present invention has been described above in detail, the present invention is by no means limited to the above embodiment and it goes without saying that various improvements and modifications can be made within the range which does not depart from the gist of the invention.

For example, although the image data of low resolution is obtained by performing prescanning in the embodiment, image data of low resolution corresponding to the prescanned data may be obtained by performing only fine scanning without performing the prescanning and reading the finely scanned image data by thinning out it.

As mentioned above in detail, the image processing apparatus of the present invention is the digital image processing apparatus preferably used in a digital printer which can effectively perform the red eye correction processing by simple manipulation and output an image of high quality without a red eye effect in high productivity.

What is claimed is:

1. An image processing apparatus for subjecting input image data of an image obtained by optical photographing to preset processing and making the input image data to output image data, comprising:
    storage means for storing the image data at high resolution that is finely scanned and the image data at low resolution that is pre-scanned;
    a display for displaying the image carried by the image data at high resolution or low resolution that is read from said storage means;
    display switching means for switching at least one portion or all portions of the image displayed on said display from the low resolution to the high resolution and vice versa;
    designation means for designating a region to be corrected including an eye, said designating means designating the region to be corrected within the image at low resolution that is displayed on said display by said display switching means; and
    red eye correction means for correcting a red eye effect in the image data at the high resolution by subjecting the eye in a region of the output image data at the high resolution that corresponds to the region designated by said designation means to eye color transformation processing,
    wherein said display switching means switches in such a way that at least the region designated by said designation means in the image of the low resolution is displayed on said display at high resolution before or after, or both before and after the region is processed based on the output image data at the high resolution by said red eye correction means.

2. The image processing apparatus according to claim 1, further comprising at least one of means for selecting either one of execution and non-execution of processing by said display switching means, said designation means and said red eye correction means as a mode, means for automatically determining said either one of the execution and the non-execution of the processing from photographing information and means for selecting and indicating said either one of the execution and the non-execution of the processing.

3. The image processing apparatus according to claim 2, wherein the photographing information is at least one of whether photographing is performed using an electronic flash or not, a subject brightness range, a photographing distance, positions of main elements in a picture, a focal length of a lens, a type of a camera.

4. The image processing apparatus according to claim 2, further comprising means for determining the non-execution of the processing from the photographing information in the mode that the processing is performed.

5. The image processing apparatus according to claim 4, wherein the photographing information is at least one of whether photographing is performed using an electronic flash or not, a subject brightness range, a photographing distance, positions of main elements in a picture, a focal length of a lens, a type of a camera.

6. The image processing apparatus according to claim 1, wherein said red eye correction means comprises:
    image data taking-out means for taking out the image data in said region including the eye in the high-resolution image that corresponds to the region designated by said designation means;
    color transforming means for subjecting the image data of said eye in the region taken out by said image data taking-out means to the eye color transformation processing; and
    image data replacing means for replacing said output image data in the region to be taken out by said image data taking-out means with the image data of the eye in the region which is substituted to the eye color transformation processing by said color transforming means.

7. The image processing apparatus according to claim 1, wherein said display switching means allows the image in said region including the eye before or after the region is processed by said red eye correction means to enlarge and display on the display at the high resolution.

8. The image processing apparatus according to claim 1, wherein said input image data of the image obtained by the optical photographing are image data which are read photoelectrically from an image on a photographic film that is photographed and then developed.

9. The image processing apparatus according to claim 8, wherein said images which are displayed on the display at the high resolution and the low resolution are images based on the input image data which are read photoelectrically at the high resolution and the low resolution from the image carried on the photographic film.

10. The image processing apparatus according to claim 1, wherein said input image data of the image obtained by the optical photographing are image data obtained directly by photographing a subject.

11. The image processing apparatus according to claim 1, said red eye correction means comprising:
    image data taking-out means for taking out the image data in said region including the eye in the high resolution image that corresponds to the region designated by said designation means;
    said image data taking-out means taking out a region of a prescribed shape and size in the image data of high resolution corresponding to the region in the image data of low resolution designated by said designation means;
    said red-eye correction means correcting red eye in the region of the high resolution image taken out by said image data taking-out means.

12. An apparatus for processing an input image to remove red-eye, comprising:
    a memory device, said memory device storing the input image at a high resolution and at a low resolution to store high resolution image data and low resolution image data;

a display device operatively connected to said memory device via a switching device, said display device displaying the low resolution image data;

an input device, said input device designating a location in the displayed low resolution image data, the location being close to or at an eye; and a red-eye correction unit operatively connected to said memory device and to said input device, said red-eye correction device taking-out a region in the high resolution image data corresponding to the designated location in the low resolution image data;

said red-eye correction device correcting a red-eye effect in the taken-out region of the high resolution image data that corresponds to the designated location;

said switching device switching the display displayed by said display device to display at least a portion of the high resolution image data; and wherein the display of the high resolution image data permits a confirmation that the red-eye correction has been effective.

13. The apparatus according to claim 12, said red-eye correction device taking out a region of a prescribed shape and size in the high resolution image data that corresponds to the designated location in the low resolution image data.

14. A method of processing an input image to remove red-eye, comprising:

storing the input image at a high resolution and at a low resolution to store high resolution image data and low resolution image data;

displaying the low resolution image data on a display device;

designating a location in the displayed low resolution image data, the location being close to or at an eye;

taking-out a region in the high resolution image data corresponding to the designated location in the low resolution image data;

correcting a red-eye effect in the taken-out region of the high resolution image data that corresponds to the designated location;

switching the display displayed by the display device to display at least a portion of the high resolution image data; and confirming that said red-eye correction has been effective by reviewing the displayed high resolution image data that has been switched by said switching step.

15. The method according to claim 14, said taking-out step taking out a region of a prescribed shape and size in the high resolution image data that corresponds to the designated location in the low resolution image data.

* * * * *